(12) United States Patent
Wang

(10) Patent No.: US 8,218,640 B2
(45) Date of Patent: *Jul. 10, 2012

(54) PICTURE DECODING USING SAME-PICTURE REFERENCE FOR PIXEL RECONSTRUCTION

(75) Inventor: Jason N. Wang, San Jose, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 893 days.

This patent is subject to a terminal disclaimer.

(21) Appl. No.: 12/210,912

(22) Filed: Sep. 15, 2008

(65) Prior Publication Data

US 2009/0010337 A1    Jan. 8, 2009

Related U.S. Application Data

(63) Continuation-in-part of application No. 11/627,867, filed on Jan. 26, 2007.

(60) Provisional application No. 60/863,767, filed on Oct. 31, 2006.

(51) Int. Cl.
*H04N 7/32* (2006.01)
*H04N 11/02* (2006.01)

(52) U.S. Cl. ......... 375/240.16; 375/240.01; 375/240.12; 375/240.15; 348/411.1; 348/412.1; 382/238; 382/239

(58) Field of Classification Search .............. 375/240.12, 375/240.15, 240.16, 240.08, 240.01, 240.24; 382/238–239; 348/411.1, 412.1, 415.1

See application file for complete search history.

(56) References Cited

U.S. PATENT DOCUMENTS

| 5,502,493 | A | 3/1996 | Meyer |
| 6,078,695 | A * | 6/2000 | Kadono ........................ 382/243 |
| 6,172,621 | B1 | 1/2001 | Iwata |
| 6,665,340 | B1 * | 12/2003 | Kimoto .................... 375/240.08 |
| 7,760,916 | B2 * | 7/2010 | Sato ............................. 382/115 |
| 7,983,342 | B2 | 7/2011 | Saha et al. |
| 2003/0099294 | A1 * | 5/2003 | Wang et al. ............. 375/240.15 |
| 2004/0042673 | A1 * | 3/2004 | Boon ........................... 382/239 |
| 2005/0276323 | A1 * | 12/2005 | Martemyanov et al. . 375/240.03 |
| 2005/0281334 | A1 * | 12/2005 | Walker et al. ............ 375/240.16 |
| 2007/0171975 | A1 | 7/2007 | Smith et al. |
| 2009/0010338 | A1 | 1/2009 | Wang |

OTHER PUBLICATIONS

Zhang, R.; Regunathan, S.L.; Rose, K.; "Video coding with optimal inter/intra-mode switching for packet loss resilience", Jun. 2000, IEEE Journal, vol. 18 Issue:6, pp. 966-976.*
U.S. Appl. No. 60/863,767, filed on Oct. 31, 2006.
U.S. Appl. No. 11/627,867, filed on Jan. 26, 2007.
US Non Final Office Action for U.S. Appl. No. 11/627,867 dated Aug. 19, 2011.
US Non Final Office Action for U.S. Appl. No. 12/210,925 dated Sep. 20, 2011.

* cited by examiner

*Primary Examiner* — Taghi Arani
*Assistant Examiner* — Amir Mehrmanesh
(74) *Attorney, Agent, or Firm* — Joshua D. Isenberg; JDI Patent

(57) ABSTRACT

Digitally encoded pictures may be decoded by padding all un-decoded pixels within a currently decoding picture with temporary pixel values to produce a padded picture and performing motion compensation using the padded picture as a reference picture.

18 Claims, 6 Drawing Sheets

US 8,218,640 B2

PICTURE DECODING USING SAME-PICTURE REFERENCE FOR PIXEL RECONSTRUCTION

CLAIM OF PRIORITY

This application is a continuation-in-part of and claims the priority benefit of U.S. patent application Ser. No. 11/627,867, to inventors Jason N. Wang and Milan Mehta, filed Jan. 26, 2007 and entitled "MULTI-THREADED STREAMING DATA DECODING", the entire contents of which are incorporated herein by reference. This application also claims the priority benefit of U.S. Provisional Patent Application No. 60/863,767, to inventors Jason N. Wang and Milan Mehta, filed Oct. 31, 2006 and entitled "MULTI-THREADED STREAMING DATA DECODING", the entire contents of which are incorporated herein by reference.

CROSS-REFERENCE TO RELATED APPLICATION

This application is related to commonly-assigned United States patent application Ser. No. 12/210,925, to inventor Jason N. Wang, filed the same date as the present application and entitled "PICTURE ENCODING USING SAME-PICTURE REFERENCE FOR PIXEL RECONSTRUCTION", the entire contents of which are incorporated herein by reference.

FIELD OF THE INVENTION

Embodiments of the present invention are related to reconstructing decoded video images and more particularly to using a currently processing picture as a reference for reconstructing image pixels.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

A very efficient and commonly used tool for redundancy removal is known as motion compensation. In the motion compensation process, the codec tries to find a best matched reference pixel block in an already coded video image to represent a currently processing pixel block. Then, instead of coding pixels in the current block, only relative spatial and temporal offsets between the currently processing block and the reference block and motion compensation residue are coded into the output video stream. As the result, the number of bits used to encode this pixel block may be much smaller than if all the pixels were to be encoded directly.

Another commonly-used coding tool is known as intra prediction. Intra prediction uses neighboring pixels or pixel blocks to predict a currently processing pixel block. But, on average, the coding efficiency of intra prediction is much lower than best match based motion compensation used in inter prediction.

As defined in existing motion compensation enabled video coding standards, H.261, H.263, MPEG-1, MPEG-2, MPEG-4, VC1 and AVC (H.264), motion compensation only happens between two different pictures. As a result, the currently processing picture must be motion predicted by reference to another picture that has already been processed. In most cases, this constraint would not cause any problem and the coder always can find a best prediction from a previously coded picture for the current picture. However, a previously coded picture may not always be available or may not be the best reference picture to use for motion compensation. For example, if the current picture is intra coded, there is no other picture available that can be used as a reference picture.

The definition of intra picture is that all predictions have to be done within the same picture. With current available video codec standards, only intra prediction can be used in an intra picture.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1A:
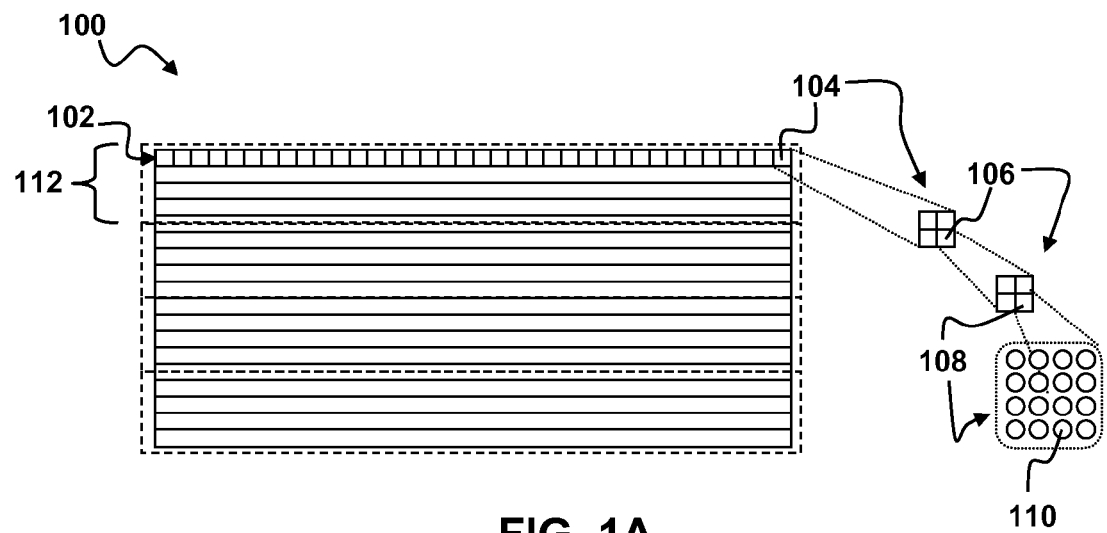
FIG. 1A is a schematic diagram illustrating one possible division of a streaming data picture for decoding according to an embodiment of the present invention.
Figure 1B:
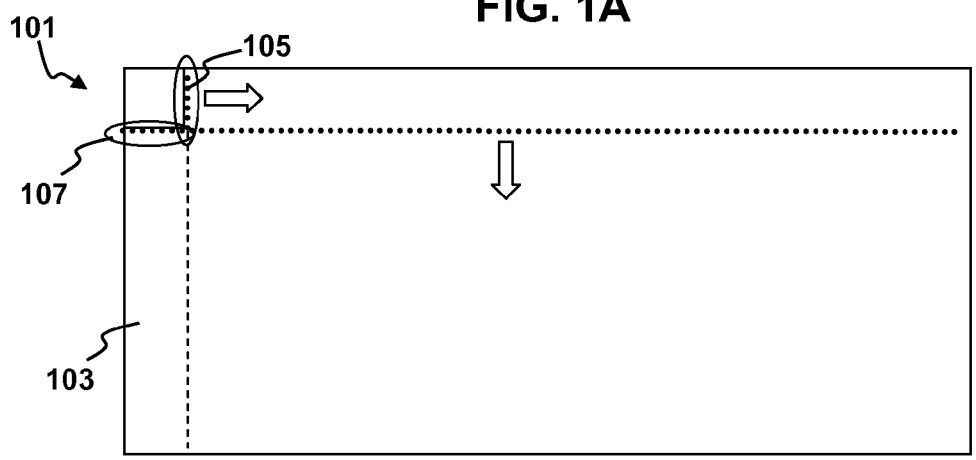
FIG. 1B is a schematic diagram illustrating an example of padding for decoding streaming data using a same-picture reference according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In embodiments of the present invention, encoding and decoding of video pictures with motion compensation may be enhanced by using the current picture as reference for compensation. Use of the current picture as a reference picture may yield much better prediction than any intra prediction. In another case, if the video content is generated artificially by computers, there are many repeated textures and objects in the same scene. Because it is more likely to have same lighting condition and same camera angle for objects in the same picture, there is a greater likelihood of finding an exact match within the same picture than in another picture. Thus, embodiments of the invention allow the current picture to be used as reference pictures to improve video coding efficiency for above cases.

If a particular implementation has limited memory usage and may not be able to buffer enough reference pictures in the reference picture buffer, embodiments of the invention allow the current picture to be used as reference pictures and utilize reference picture buffer with more efficiency.

Because all existing motion compensation enabled video standards already have reference picture handling infrastructure, it is possible to handle a currently-processing picture the same as any other reference pictures. This may be accomplished by placing the currently processing picture into a reference list for decoding. As a result, the existing reference picture based motion compensation process may be reused without having to add extra complexity or memory buffer for the decoder. Because AVC video coding standard has the most complex reference picture handling process, the following detailed explanation uses AVC as an example to show how the invention can fit into the current video coding standard. However, this example is presented for the purposes of illustration and should not be construed in any way as a limitation upon the present invention.

In some embodiments, post processing may be implemented before the whole picture has been decoded. For example, in some decoder implementations there may be sufficient information to do de-blocking on one or two rows of macroblocks once the pixels for those rows have been decoded. It is up to the decoder implementation and not constrained by the coding standard. By way of example in an AVC standard, de-blocking can process any macroblocks if these macroblocks are no longer used as intra reference macroblocks. In such a case, the intra prediction process in the AVC decoding module typically uses left, upper left, upper and upper right neighbor macroblocks to do pixel prediction. Therefore, the de-blocking process may be implemented if it is delayed by at least two macroblocks (four for MB frame field adaptive coded interlace streams) from the decoding process in both horizontal and vertical directions.

For better decoding performance, most hardware decoders do post processing before a whole picture is decoded. Some software decoders have an option to start de-blocking before a whole picture is decoded. An example of such a decoder is described, e.g., in U.S. Provisional Patent Application No. 60/863,767 and U.S. patent application Ser. No. 11/627,867, both of which are entitled "Multi-Threaded Streaming Data Decoding", both of which are incorporated herein by reference. In this type of decoder implementation, the minimum requirement to start de-blocking is to finish decoding two macroblock rows.

In some embodiments, pre de-blocking pixels may be better for prediction. If motion prediction is allowed in the same picture and it is desired to use pre de-blocking pixels for reference, the de-blocking process may be further delayed. The amount of delay may be up to a maximum allowed motion vector length.

In embodiments of the present invention, streaming data may be broken down in suitable sized units for coding and decoding. For example, in the case of streaming video data, the streaming data may be broken down into pictures with each picture representing a particular image in a series of images. As shown in FIG. 1A, a single picture 100 may be broken down into one or more sections. As used herein, the term "section" refers to group of one or more pixels within a picture. A section can range from a single pixel within the picture, up to the whole picture. Non-limiting examples of sections include slices 102, macroblocks 104, sub-macroblocks 106, blocks 108 and individual pixels 110. As illustrated in FIG. 1A, each slice 102 contains one or more rows of macroblocks 104. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain a four by four arrangement of sixteen pixels 110.

Conventionally, streaming video images have been decoded using a single thread for the decoding of each picture or the decoding of each slice. In a conventional single-thread decoder all decoding tasks for one macroblock are completed before decoding the next macroblock. Multithreaded picture decoding—i.e., decoding multiple pictures in parallel, may also be done. To facilitate multi-threaded decoding within pictures, each picture 100 may be broken down into two or more sections 112 that encompass one or more slices. In embodiments of the present invention it is possible for a slice 102 to "straddle" the boundary between to adjacent sections 112. Thus, a slice may be shared between two different sections.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors used in the CRT screen combined with the persistence of vision results in the two fields being perceived as a continuous image. For other display devices, such as liquid crystal displays, it may be necessary to interlace the two fields into a single picture before being displayed. Streaming data representing encoded images typically includes information indicating whether the image is a field or a frame. Such information may be included in a header to the image. Embodiments of the present invention allow a video codec to find redundancies within a currently processing picture without having to break the picture into fields.

In the prior art, video pictures where characterized by low resolution, e.g., a 16 pixel by 16 pixel minimum macroblock size and allows one motion vector per macroblock. New codecs allow for higher resolution, e.g., a 4 pixel by 4 pixel minimum block size and allows one motion vector per block. Thus one can assign a motion vector to a 4×4 block within a macroblock. For a typical video picture that is 720 pixels wide by 480 pixels high with 16×16 pixel macroblocks it may be unlikely to find a good match for prediction within the same picture. However, a different situation may be present for high-definition images (e.g., 1920 pixels wide by 1088 pixels high) that are computer generated, e.g., from video game content for compression into a coded video stream. It is noted that developers of computer generated video, e.g., video game developers, often re-use textures within the same picture. In addition, in computer-generated video, the background tends to be kept still. If same background is used with the same texture shot with the same virtual "camera" in the same simulated lighting conditions there is a much better chance for a match in the same picture.

It is noted that the motion vector only can refer to a pixel block in an output picture buffer (sometimes also called a frame buffer). As used herein, "a match" refers to a section, e.g., a block or macroblock that is similar to the current processing section in the same picture and is saved in the frame buffer. In general terms, this would exclude the same macroblock or block in the currently processing picture because the same macroblock or block has not yet been written into the frame buffer.

According to an embodiment of the present invention, the current picture may be made available for motion compensation just like any other reference pictures. This may be done by simply adding the currently processing picture to a motion compensation list. However, there are differences between the current picture and other reference pictures. For example, post processing for the current picture, e.g., de-blocking, is not finished. In embodiments of the invention this difference may be ignored to simplify the implementation and it may be assumed that de-blocking happens after the pixel prediction and reconstruction for the whole picture is done. In addition, the current picture is not finished with pixel prediction and reconstruction. This means that there may be unknown pixels in the current picture to be used as reference pixels.

To address the issue of unknown reference pixels within the currently processing picture, embodiments of the present invention utilize a technique referred to herein as pixel padding. By, pixel padding means it is meant that a known value of a neighboring pixel value may be assigned temporarily to an unknown pixel until the unknown pixel has been processed. If the neighbor pixel is also unknown, the neighbor's neighbor pixel can be used. If the unknown pixel is the first pixel in a picture, a pixel median value may be used as the pixel value. By way of example, and not by way of limitation, the median pixel value may be a median value between a highest possible value and a lowest possible value for the pixel. For example, if the pixel value is an n-bit value, where n is the number of bits that describe the value, the median value may be $2^{n-1}$. By way of numerical example, if n=8, the median pixel value is $2^7$=128.

There are multiple ways to pad pixels in the currently processing picture. Most of them achieve about the same efficiency. Embodiments of the invention use a padding algorithm that is already available within existing codecs, which may or may not be the best possible one. Alternatively, could fill in missing pixels with some average color.

Once all unknown pixels in one picture are padded, the padded version of the current picture may be used as a reference picture in the same manner as other reference pictures. The motion compensation method may be the same as that defined in each video coding standard.

It is noted that a pixel within a picture typically has multiple neighbors. The selection of the neighbor pixels to use as reference pixels is somewhat dependent on the order in which pixels are decoded. For example, in certain embodiments of this invention, only upper neighbor and left neighbor are used since the macroblocks are decoded starting with the upper left macroblock working along the row toward the right and then starting with the next row of macroblocks with the leftmost macroblock in that row. For unknown pixels in the first macroblock row or macroblock pair row of a picture, left neighbor pixels may be given priority as reference pixels, since these pixels are more likely to have been decoded. For pixels which do not have left neighbor pixels, upper neighbor pixels may alternatively be used. Otherwise, the left neighbor pixels are always used. For other unknown pixels which are not in the first macroblock row or macroblock pair row, upper neighbor pixels may be used preferentially.

FIGS. 1B-1E illustrate examples of padding a currently processing picture by assigning temporary pixel values to un-decoded pixels. In the example shown in FIG. 1B, only the first macroblock 104 in the first macroblock row 102 and first macroblock column 103 of the currently processing picture 101 has been decoded. The values of the pixels in the last pixel column 105 of the first macroblock 104 may be assigned to the remaining pixels in the first row 102. The remaining un-decoded pixels in the first macroblock column 103 may be assigned the values of the pixels in the last pixel row 107 of the first macroblock 104. All other remaining un-decoded pixels in the currently processing picture 101 may be assigned the value of the last pixel in the last pixel column 105 and/or last pixel row 107.

It is noted that the order in which pixels are coded is somewhat dependent on the mode in which the pictures or encoded. For example, in the AVC standard, for pictures coded in the macroblock adaptive frame field (MB-AFF) mode, pixels are coded in macroblock pairs in raster scan order. For a picture encoded in non-MB-AFF mode, the pixels are coded in macroblocks in raster scan order. The effect of this difference on the padding may be understood by referring to FIG. 1C and FIG. 1D.

Figure 1C:
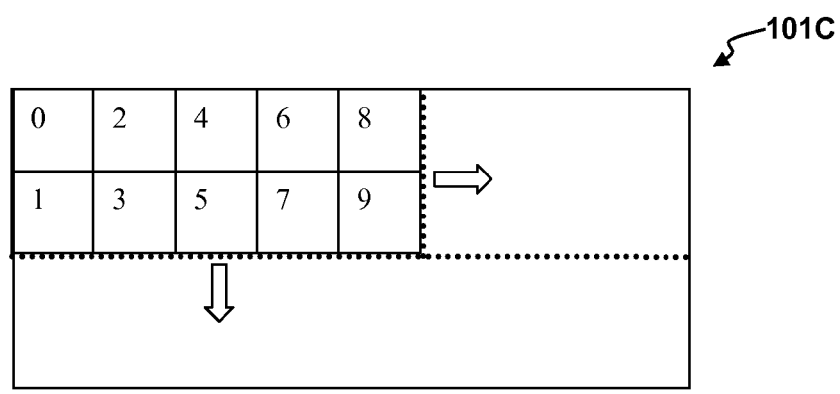
FIG. 1C is a schematic diagram illustrating an example of padding of a streaming data picture coded using macroblock adaptive frame field coding order for decoding streaming data using a same-picture reference according to an embodiment of the present invention.

As seen in FIG. 1C, for an MB-AFF coded picture 101C, macroblocks 0, 1, 2, 3, 4, 5, 6, 7, 8 and 9 have been encoded in vertical pairs in raster scan order. In such a case, the macroblocks are decoded in the same order. If macroblocks 0 through 9 have been decoded, the remaining pixels may be padded as follows. The last column of pixels in macroblocks 8 and 9 may be repeated across the remainder of the first and second macroblock rows respectively. The last row of pixels in the second macroblock row may then be repeated for the remaining rows of un-decoded pixels in the picture 101C.

Figure 1D:
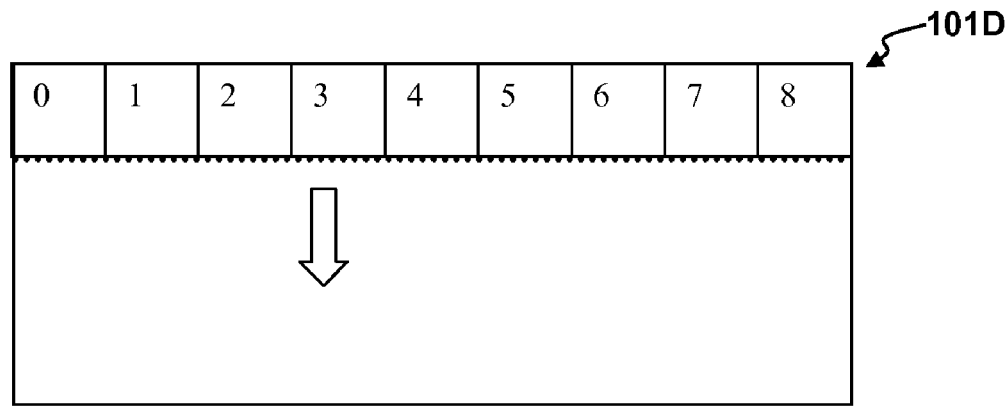
FIG. 1D is a schematic diagram illustrating an example of padding of a streaming data picture coded using non-macroblock adaptive frame field coding order for decoding streaming data using a same-picture reference according to an embodiment of the present invention.

In FIG. 1D, for an MB-AFF coded picture 101D, macroblocks 0, 1, 2, 3, 4, 5, 6, 7 and 8 have been encoded in raster scan order and are decoded in the same order. If macroblocks 0 through 8 have been decoded, the remaining pixels may be padded as described above with respect to FIG. 1B. Specifically, the last column of pixels of the last decoded macroblock in the row may be repeated across the rest of the macroblock row for the remaining columns of pixels in the row and the last row of pixels in the macroblock row (including padding pixels) may be repeated for the remaining un-decoded rows of pixels in the picture 101D. In the particular example illustrated in FIG. 1D, since the entire first macroblock row has been decoded, the last row of pixels in the first macroblock row may be repeated for the remaining rows of un-decoded pixels in the picture 101D.

Figure 1E:
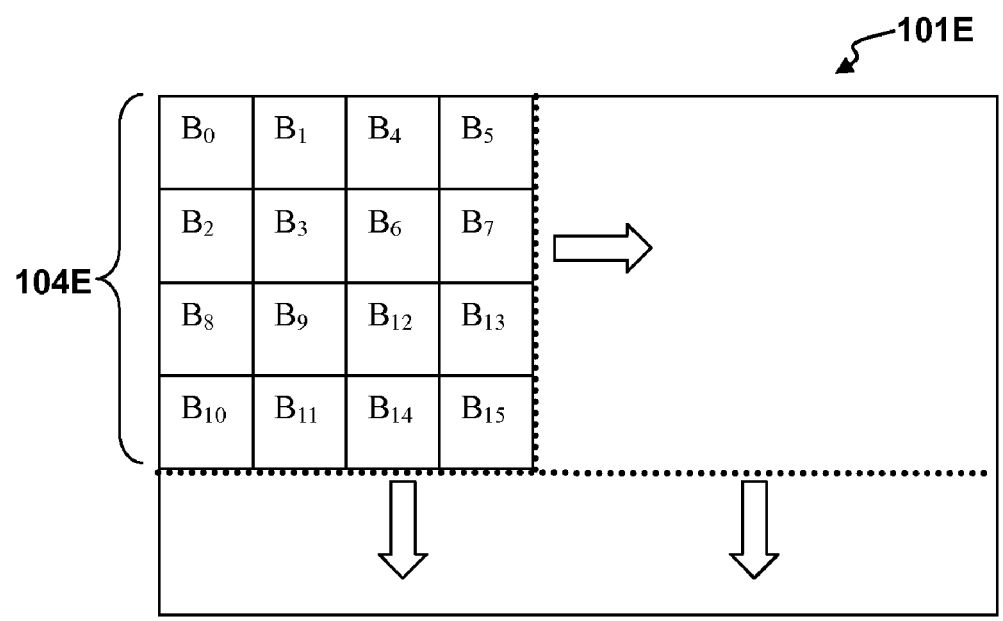
FIG. 1E is a schematic diagram illustrating an example of padding of a streaming data picture having a particular block coding order for decoding streaming data according to an embodiment of the present invention.

Pixel padding in conjunction with embodiments of the present invention may be implemented even if less than a full macroblock has been decoded. For example, as shown in FIG. 1E, blocks $B_0$ through $B_{15}$ within a macroblock 104E may be coded in the order indicated by the numerical indexes of the blocks. It is desirable for the padding rules to work for this coding scheme. For example, if the macroblock 104E has only been decoded up to block $B_3$, the last pixel column of blocks $B_1$ and $B_3$ may be repeated across the rest of the row and the bottom row of pixels in the resulting row may be repeated for the remaining rows of the picture.

Embodiments of the present invention allow a currently processing picture to be used as one of the reference pictures in decoding digital images. Embodiments of the present invention may utilize the hardware and software resources available for existing codecs.

Figure 2A:
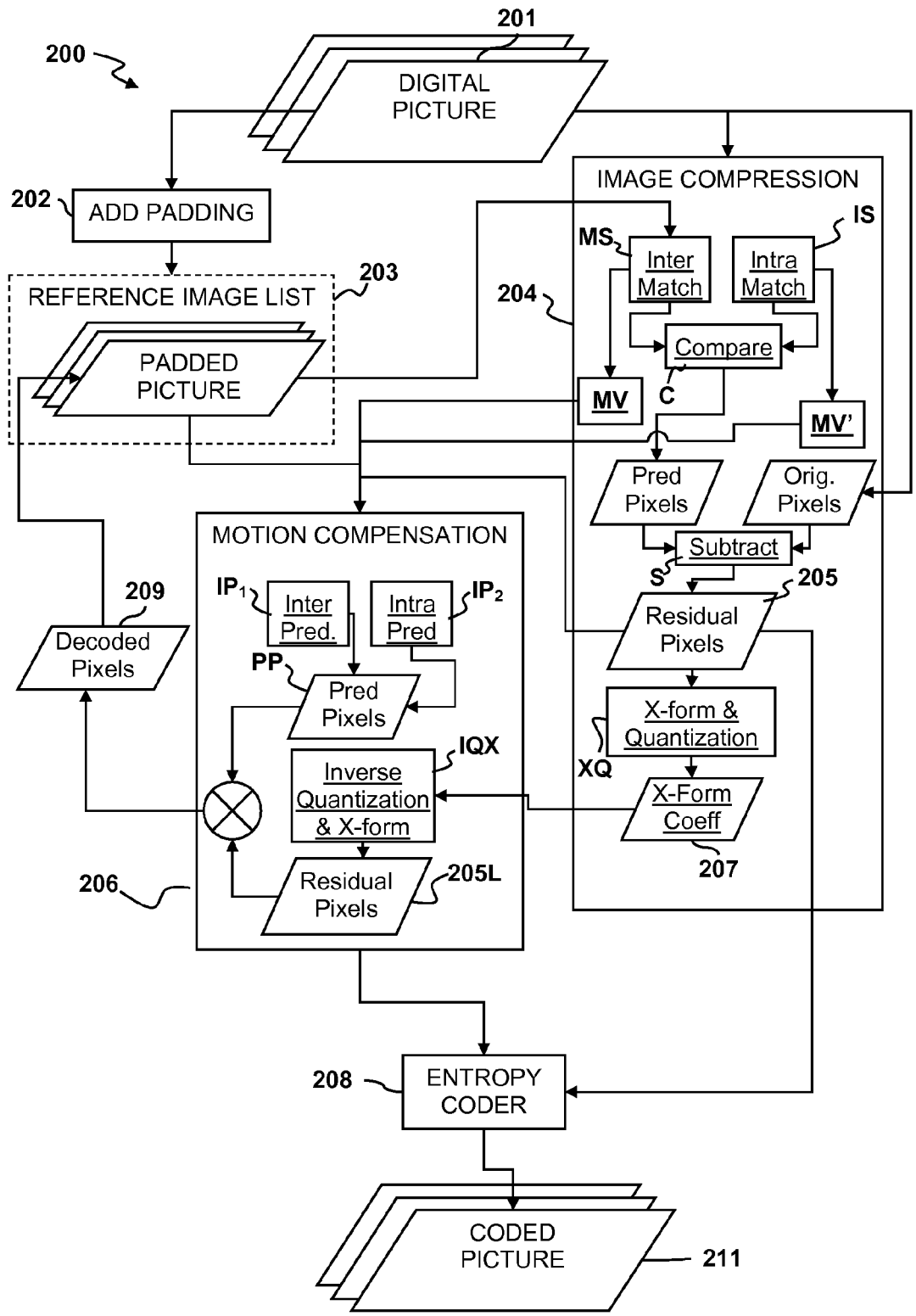
FIG. 2A is a flow diagram illustrating digital picture encoding according to an embodiment of the present invention.

According to an embodiment of the present invention, an intra picture may be encoded according to a method 200 as illustrated in FIG. 2A. The encoder receives a plurality of digital images 201 and encodes each image. Encoding of the digital picture 201 may proceed on a section-by-section basis. The encoding process for each section generally involves padding 202, image compression 204 and motion compensation 206. To facilitate a common process flow for both intra-coded and inter-coded pictures, all un-decoded pixels within a currently processing picture 201 are padded with temporary pixel values to produce a padded picture, as indicated at 202. The padding may proceed, e.g., as described above with respect to FIG. 1B through FIG. 1E. The padded picture is added to a list of reference pictures 203 stored in a buffer. Padding the picture at 202 facilitates the use of the currently-processing picture as a reference picture in subsequent processing during image compression 204 and motion compensation 206.

As used herein, image compression refers to the application of data compression to digital images. The objective of the image compression 204 is to reduce redundancy of the image data for a give image 201 in order to be able to store or transmit the data for that image in an efficient form of compressed data. The image compression 204 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 201 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 204 may include region of interest coding in which certain parts of the image 201 are encoded with higher quality than others. This can be combined with scalability (encode these parts first, others later). Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 204 the encoder may search for the best way to compress a block of pixels. The encoder can search all of the reference pictures in the reference picture list 203, including the currently padded picture, for a good match. If the current picture is coded as an intra picture, only the padded picture is available in the reference list. The image compression at 204 produces a motion vector MV and transform coefficients 207 that are subsequently used along with one or more of the reference pictures (including the padded picture) during motion compensation at 206.

The image compression 204 generally includes a motion search MS for a best inter prediction match, an intra search IS for a best intra prediction match, an inter/intra comparison C to decide whether the current macroblock is inter-coded or intra-coded, a subtraction S of the original input pixels from the section being encoded with best match predicted pixels to calculate lossless residual pixels 205. The residual pixels then undergo a transform and quantization XQ to produce transform coefficients 207. The transform is typically based on a Fourier transform, such as a discrete cosine transform (DCT). For existing video standards, if an intra picture is to be coded, the motion search MS and inter/intra comparison C are turned off. However, in embodiments of the present invention, since the padded picture is available as a reference, these functions are not turned off. Consequently, the image compression 204 is the same for intra-coded pictures and inter-coded pictures.

The motion search MS may generate a motion vector MV by searching the picture 201 for a best matching block or macroblock for motion compensation as is normally done for an inter-coded picture. If the current picture 201 is an intra-coded picture, by contrast, existing codecs typically do not allow prediction across pictures. Instead all motion compensation is normally turned off for an intra picture and the picture coded by generating transform coefficients and performing pixel prediction. In embodiments of the present invention, however, an intra picture may be used to do inter prediction by matching a section in the current picture to another offset section within that same picture. The offset between the two sections may be coded as a motion vector MV' that can be used that for motion compensation at 206. By way of example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain existing codecs have functions that can convert an offset between two blocks or macroblocks into a motion vector, which can be followed to do motion compensation at 206. However, these functions are conventionally turned off for encoding of intra pictures. In embodiments of the present invention, the codec may be instructed not to turn off such "inter" picture functions for encoding of intra pictures.

As used herein, motion compensation refers to a technique for describing a picture in terms of the transformation of a reference image to a currently processing image. In general, the motion compensation 206 acts as a local decoder within the encoder implementing the encoding process 200. Specifically, the motion compensation 206 includes inter prediction $IP_1$ and (optionally) intra prediction $IP_2$ to get predicted pixels PP using the motion vector MV or MV' from the image compression 204 and reference pixels from a picture in the reference list. Inverse quantization and inverse transformation IQX using the transform coefficients 207 from the image compression 204 produce lossy residual pixels 205L which are added to the predicted pixels PP to generate decoded pixels 209. The decoded pixels 209 are inserted into the reference picture and are available for use in image compression 204 and motion compensation 206 for a subsequent section of the currently-processing picture 201.

After the decoded pixels have been inserted, un-decoded pixels in the reference picture may undergo padding 202.

In a conventional encoder, if the current picture is intra coded, the inter-prediction portions of motion compensation 206 are turned off because there are no other pictures that can be used for motion compensation. However, in embodiments of the present invention, by contrast, motion compensation may be performed on any picture 201 independent of whether a particular picture is to be inter coded or intra coded. In embodiments of the present invention, the encoder implementing the method 200 may be modified to add the padded picture to the reference picture list 203 and the inter-prediction portions of the motion compensation 206 are not turned off, even if the currently processing image is to be intra coded. As a result, the process flow for both inter coded sections and intra coded sections is the same during motion compensation 206. The only major difference is the selection of the reference picture to be used for encoding.

By way of example, and not by way of limitation, in one type of motion compensation, known as block motion compensation (BMC), each image may be partitioned into blocks of pixels (e.g. macroblocks of 16×16 pixels). Each block is predicted from a block of equal size in the reference frame. The blocks are not transformed in any way apart from being shifted to the position of the predicted block. This shift is represented by a motion vector MV. To exploit the redundancy between neighboring block vectors, (e.g. for a single moving object covered by multiple blocks) it is common to encode only the difference between a current and previous motion vector in a bit-stream. The result of this differencing process is mathematically equivalent to a global motion compensation capable of panning. Further down the encoding pipeline, the method 200 may optionally use entropy coding 208 to take advantage of the resulting statistical distribution of the motion vectors around the zero vector to reduce the output size.

It is possible to shift a block by a non-integer number of pixels, which is called sub-pixel precision. The in-between pixels are generated by interpolating neighboring pixels. Commonly, half-pixel or quarter pixel precision is used. The computational expense of sub-pixel precision is much higher due to the extra processing required for interpolation and on the encoder side, a much greater number of potential source blocks to be evaluated.

Block motion compensation divides up a currently encoding image into non-overlapping blocks, and computes a motion compensation vector that indicates where those blocks come from in a reference image. The reference blocks typically overlap in the source frame. Some video compression algorithms assemble the current image out of pieces of several different reference images in the reference image list 203.

Figure 2B:
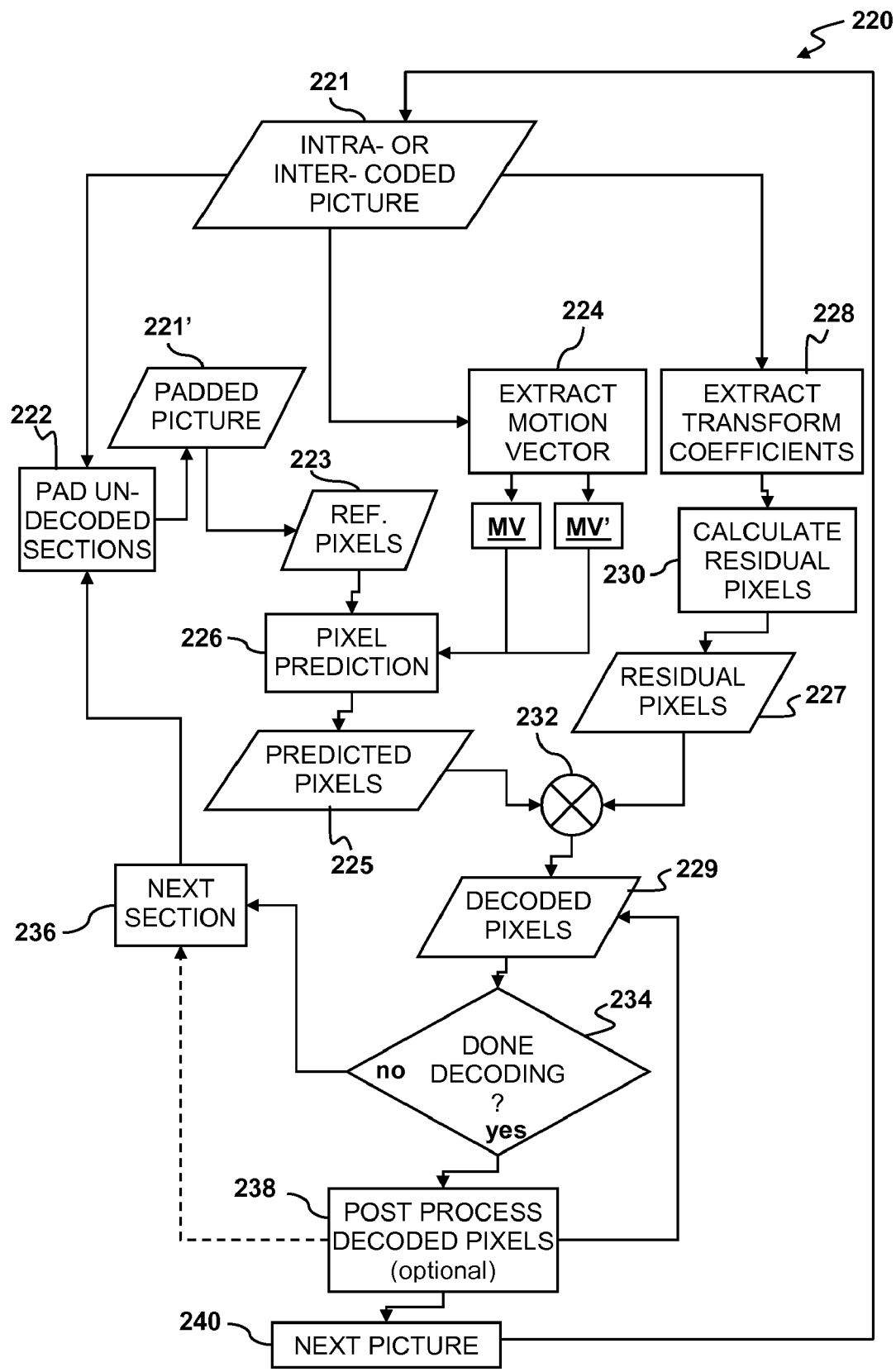
FIG. 2B is a flow diagram illustrating digital picture decoding according to an embodiment of the present invention.

The result of the padding 202, image compression 204 and motion compensation 206 and (optionally) entropy coding 208 is a coded picture 211. The motion vector MV, (and/or intra prediction mode motion vector MV') and transform coefficients 207 may be included in the coded picture 211. Once a picture has undergone encoding as shown in FIG. 2A, it may be transmitted and then decoded in accordance with another embodiment of the present invention. Picture decoding in accordance with embodiments of the present invention may proceed in accordance with a method 220 as illustrated in FIG. 2B. As indicated at 222, an un-decoded portion of the picture may be padded, e.g., as described above with respect to FIG. 1A, FIG. 1B, FIG. 1C, FIG. 1D or FIG. 1E to produce a padded picture 221'. If the current picture 221 has been encoded as described above with respect to FIG. 2A, a motion vector MV (or intra mode motion vector MV') may be extracted from the current picture 221 at 224, independent of whether the current picture is inter-coded or intra-coded.

It is noted that in the prior art, an inter picture could be encoded using both inter mode and intra mode functions. An intra picture, by contrast could only be encoded using the intra mode functions. In certain embodiments of the present invention both inter mode and intra mode functions may be allowed for each individual macroblock inside an intra picture. As a result, the same data flow is used for both intra pictures and inter pictures. The advantage of this may be understood if one considers video encoding or decoding as a stage in a video processing pipeline. If encoding or decoding of intra and inter pictures use the same process and consume the same number of cycles, the whole pipeline will be smoother.

Once the motion vector MV (or MV') has been extracted, it may be used for pixel prediction 226 of an un-decoded section of the current picture 221 to generate predicted pixels 225. The pixel prediction 226 may use reference pixels 223 from the padded picture 221' as reference pixels 223. The reference pixels 223 may come from un-padded portions of the padded picture 221'. In addition, pixels obtained in the padding process 222 may also be used as reference pixels 223. The pixel prediction 226 may include both inter-prediction and intra-prediction for both inter-coded pictures and intra-coded pictures. In particular, the pixel prediction 226 may use a conventional inter mode motion vector MV or an intra mode motion vector MV' generated as described above. In conjunction with pixel prediction at 226, the decoder implementing the decoding method 220 may extract transform coefficients from the current picture 221 as indicated at 228 and calculate residual pixels 227 from the transform coefficients as indicated at 230. The predicted pixels 225 and residual pixels 227 may be combined, as indicated at 232, e.g., by simple addition, to produce decoded pixels 229.

If, at 234, decoding is not finished, decoding proceeds for the next portion of the current picture 221, as indicated at 236. Once decoding is finished, post processing may be performed on the decoded pixels 229 as indicted at 238. Examples of post processing include, but are not limited to de-blocking, natural noise reduction, coding error noise reduction, color enhancement, color space conversion, interlace progressive conversion, frame rate conversion, picture size scaling, alpha blending and 3-D object wrapping. Post processing is typically done on a section if it is far enough away from a currently processing section so that it will not be used as a source of reference pixels. Determining whether a section will be used for pixel prediction may be part of the decision at 234. Once post processing is finished for all pixels, the foregoing process may be repeated for another picture, as indicated at 240.

It is noted that the nature of the decision at 234 as to whether decoding is finished depends on whether current picture pixels are used as reference pixels before or after post processing. To achieve the best prediction it is preferable to use the current picture pixels after post processing. In such a case post processing of the pixels from the current section may take place after pixel prediction for the current section and before pixel prediction for the next section. However, to achieve the simplest implementation it is preferable to use pre-post processing pixels as reference pixels since otherwise the post processed current picture pixels would have to be fed back to each macroblock before decoding the next macroblock. In such a case, decoding of the next section may begin after the pixel prediction for the current section has been completed but before post processing of the pixels for the current section.

In a preferred embodiment, pre-post-processing pixels are used as reference pixels for same picture macroblock inter prediction. In such a case, the padding pixels may be copied from de-coded macroblocks that have not yet undergone post-processing, such as de-blocking.

In some cases, for example, intra-coded pictures and inter-coded pictures containing computer generated artificial content, using portions of the current picture as a source of reference pixels may yield a better prediction than any other prediction mode. But, according to all existing video coding standards, using the current picture as a reference is not allowed for intra-coded pictures. This may not be an obvious solution for camera-captured natural scenes or low resolution pictures, since it is less likely to have the best prediction from the current picture. However, it still benefits from the advantages of simplified process flow for both inter- and intra-coded pictures.

Figure 3:
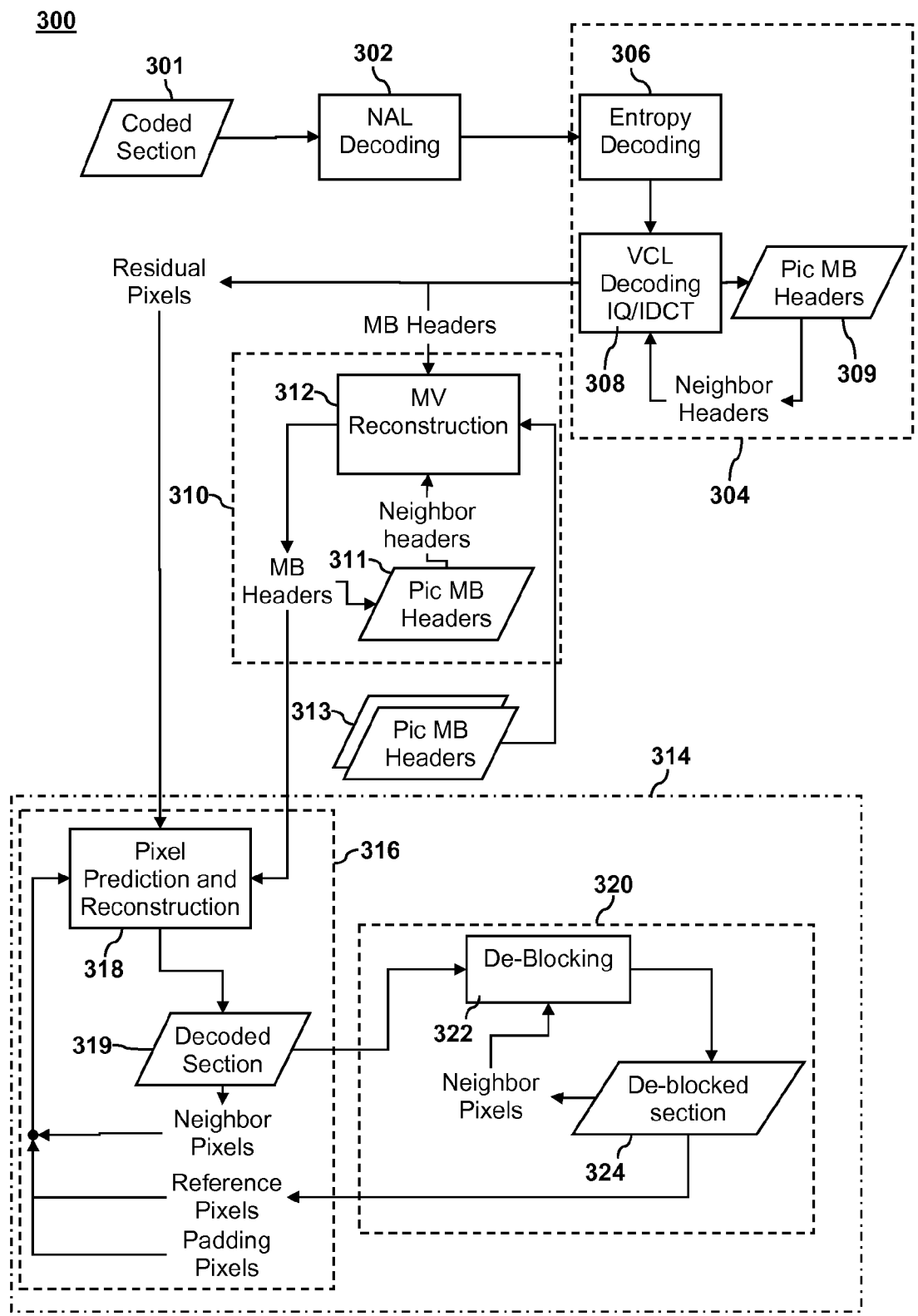
FIG. 3 is a flow diagram illustrating the general process flow in streaming data decoding.

FIG. 3 illustrates an example of a possible process flow in a method 300 for decoding of streaming data 301. This particular example shows the process flow for video decoding, e.g., using the AVC (H.264) standard. The coded streaming data 301 may initially be stored in a buffer. Where coded streaming data 301 (e.g., a video data bitstream) has been transferred over a network, e.g., the Internet, the data 301 may initially undergo a process referred to as network abstraction layer (NAL) decoding, indicated at 302. NAL decoding may remove from the data 301 information added to assist in transmitting the data. Such information, referred to as a "network wrapper" may identify the data 301 as video data or indicate a beginning or end of a bitstream, bits for alignment of data, and/or metadata about the video data itself. In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section.

Due to its complexity, NAL decoding is typically done on a picture and slice level. The smallest NAL buffer used for NAL decoding is usually slice sized. Fortunately, the NAL decoding process 302 involves a relatively low number of cycles. Consequently, the NAL decoding process 302 may be done on a single processor.

In some embodiments, after NAL decoding at 302, the remaining decoding illustrated in FIG. 3 may be implemented in three different thread groups or task groups referred to herein as video coded layer (VCL) decoding 304, motion vector (MV) reconstruction 310 and picture reconstruction 314. The picture reconstruction task group 314 may include pixel prediction and reconstruction 316 and post processing 320. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain codecs may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 304 are typically at the macroblock level for macroblocks within the same slice. Consequently results produced by the VCL decoding process 304 may be buffered at the macroblock level.

VCL decoding 304 often includes a process referred to as Entropy Decoding 306, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bitstreams. Decoding the entropy layer of AVC(H.264)-coded data streams can be computationally intensive and may present challenges for devices that decode AVC(H.264)-coded bitstreams using general purpose microprocessors. To decode high bit-rate streams targeted by the Blu-ray or the HD-DVD standards, the hardware needs to be very fast and complex, and the overall system cost could be really high. One common solution to this problem is to design special hardware for CABAC decoding. Alternatively, entropy decoding may be implemented in software. An example of a software implementation of entropy decoding may be found in co-pending U.S. Provisional Patent Application No. 60/823,620, to Xun Xu, filed Aug. 25, 2006 and entitled "ENTROPY DECODING METHODS AND APPARATUS", which is incorporated herein by reference.

In addition to Entropy Decoding 306, the VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks.

VCL decoding 304 may be implemented at a macroblock level data dependency frequency. Specifically, different macroblocks within the same slice may undergo VCL decoding in parallel and the results may be sent to the motion vector reconstruction task group 310 for further processing.

Subsequently, all macroblocks in the picture or section may undergo motion vector reconstruction 310. The MV reconstruction process 310 may involve motion vector reconstruction 312 using headers from a given macroblock 311 and/or co-located macroblock headers 313. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process based on residual pixels from the VCL decoding process 304 and motion vectors from the MV reconstruction process 310. The data dependency frequency (and level of parallelism) for the MV depends on whether the MV reconstruction process 310 involves co-located macroblocks from other pictures. For MV reconstruction not involving co-located MB headers from other pictures the MV reconstruction process 310 may be implemented in parallel at the slice level or picture level. For MV reconstruction involving co-located MB headers the data dependency frequency is at the picture level and the MV reconstruction process 310 may be implemented with parallelism at the slice level.

The results of motion vector reconstruction 310 are sent to the picture reconstruction task group 314, which may be parallelized on a picture frequency level. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be parallelized to enhance the efficiency of decoding. These tasks may be parallelized within the picture reconstruction task group 314 at a macroblock level based on data dependencies. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks. Pixel prediction and reconstruction 318 produces decoded sections 319 (e.g. decoded blocks or macroblocks) that include neighbor pixels which may be used as inputs to the pixel prediction and reconstruction process 318 for a subsequent macroblock. The data dependencies for pixel prediction and reconstruction 316 allow for a certain degree of parallel processing at the macroblock level for macroblocks in the same slice.

In embodiments of the present invention, pixel prediction may use pixels from within the current picture that is being decoded as reference pixels instead of pixels from an already decoded picture. Any reference pixels that have not been decoded may be replaced by padding pixels, which may be determined from pixels within the current picture that have already been decoded. If no pixels have been decoded, the values of the padding pixels may be determined arbitrarily as discussed above.

The post processing task group 320 may include a de-blocking filter 322 that is applied to blocks in the decoded section 319 to improve visual quality and prediction performance by smoothing the sharp edges which can form between blocks when block coding techniques are used. The de-blocking filter 322 may be used to improve the appearance of the resulting de-blocked sections 324.

The decoded section 319 or de-blocked sections 324 may provide neighboring pixels for use in de-blocking a neighboring macroblock. In addition, decoded sections 319 including sections from a currently decoding picture may provide reference pixels for pixel prediction and reconstruction 318 for subsequent macroblocks. It is during this stage that pixels from within the current picture may be used for pixel prediction within that same current picture as described above, independent of whether the picture is inter-coded or intra-coded. Deblocking 320 may be parallelized on a macroblock level for macroblocks in the same picture.

The decoded sections 319 produced before post processing 320 and the post-processed sections 324 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

Thus, for H.264, after pixel decoding, the decoded section 319 is saved in the output picture buffer. Later, the post processed sections 324 replace the decoded sections 319 in the output picture buffer. For non-H.264 cases, the decoder only saves decoded sections 319 in the output picture buffer. The post processing is done at display time and the post processing output may not share the same buffer as the decoder output picture buffer.

For most multi-processor hardware platforms, the inter processor data access delay is shorter than the time interval between video pictures. However, only a few parallel processing engines can do inter-processor data transfer faster than the macroblock processing speed. It is acceptable to have two tasks exchange data at the picture frequency. Based on the picture frequency dependencies described above with respect to FIG. 3, it is possible to break up the decoding process 300 into five separate tasks. These tasks are A) NAL decoding 302 and decoder internal management, B) VCL syntax decoding and IQ/IDCT 304, C) motion vector reconstruction 310 and D) pixel prediction and reconstruction 316 and E) de-blocking 320.

In general, NAL decoding may be done at a picture or slice level data dependency frequency. For codecs such as AVC (H.264) the data dependencies involved in NAL decoding 302 may be fairly complex yet the overall NAL decoding process 302 may take a relatively low number of cycles. Consequently it may be more efficient to implement all NAL decoding 302 on a single processor rather than to attempt to parallelize this process. The motion vector reconstruction task 310 typically takes about one tenth as many processor cycles as for VCL syntax decoding and IQ/IDCT 304, pixel prediction and reconstruction 316 and de-blocking 320. The computational complexities of the latter three tasks are fairly similar. However, the execution cycle allocation among these three large cycle tasks is different for different coded video streams.

Within the VCL syntax decoding and IQ/IDCT 304 there are only macroblock level data dependencies within each slice. For this task, the slices may be treated as being independent of each other. The motion vector reconstruction task 310 depends on the output of the VCL syntax decoding and IQ/IDCT 304 for input. The pixel prediction and reconstruction task 316 takes the outputs of the VCL syntax decoding and IQ/IDCT task 304 and motion vector reconstruction task 310 as inputs. Within the motion vector reconstruction task 310 and pixel prediction and reconstruction task 318 there are macroblock level data dependencies, but slices within one picture are independent of each other.

The pixel prediction and reconstruction task 316 may involve motion compensation. The picture dependency in the pixel prediction and reconstruction task 316 may result from such motion compensation. As discussed above, motion compensation is a process that normally uses a previously decoded picture to predict the current picture. In the motion compensation process, a two-dimensional vector, called a motion vector, is used to reference the pixels in a previously decoded picture. The picture level dependency in the motion vector reconstruction task 310 is caused by direct prediction. In direct prediction, a previously decoded macroblock's motion vector is used to calculate the current macroblock's motion vector. Although conventionally, the referenced macroblock is in a previously decoded reference picture at the same position of the current macroblock. In embodiments of the present invention, by contrast, a section, (e.g., a block or macroblock) within the current picture is used as the reference.

In an AVC decoder, the previously decoded reference picture is the output of the de-blocking task 320. Because of limitations on motion vector ranges defined by the coding standard, not all the pixels in the previous picture may be available to predict a certain macroblock in the current picture. For example, the motion vector range for an AVC level 4.1 stream is −512 to 511.75 pixels vertically and −1024 to 1023.75 pixels horizontally. If the picture size is 1920×1088 pixels, about one quarter of the pixels in the reference picture can be used for prediction of a corner macroblock. By contrast, almost all of the pixels in the reference picture can be used for prediction of a center macroblock.

Note that in the example depicted in FIG. 3, there is no dependency loop between the VCL decoding and IQ/IDCT task 308 and any other tasks. As such, this task may be merged into any or all of the VCL decoding task 304, motion vector reconstruction task 310 or pixel prediction and reconstruction task 316 to balance the task loads amongst available processors. Because some blocks may not have DCT coefficients, merging the IQ/IDCT task 308 into the block syntax decoding loop can allow the decoder to do IQ/IDCT only for coded blocks and reduce the number of branches.

The decoding method described above with respect to FIG. 3 may be implemented in a single thread. Alternatively, the decoding method of FIG. 3 may be implemented in multiple threads with a processing module capable of implementing parallel processing. In particular, different sections of a picture may be processed in parallel. As used herein, processing in parallel means that, to some extent, the processing of two or more different tasks overlaps in time. Table I below gives an example of how the different task groups of FIG. 3 may be processed in parallel on four different sections of a picture over the course of six intervals of time. Each section may be processed with a different processor.

TABLE I

| Int | SECTION 1 | SECTION 2 | SECTION 3 | SECTION 4 |
|---|---|---|---|---|
| 1 | VCL DECODING | | | |
| 2 | MV RECONSTRUCTION | VCL DECODING | | |
| 3 | PICTURE RECONSTRUCTION | MV RECONSTRUCTION | VCL DECODING | |
| 4 | | PICTURE RECONSTRUCTION | MV RECONSTRUCTION | VCL DECODING |
| 5 | | | PICTURE RECONSTRUCTION | MV RECONSTRUCTION |
| 6 | | | | PICTURE RECONSTRUCTION |

It is noted that other parts of the decoding process, such as NAL decoding 302 may be implemented in parallel with VCL decoding 304, Motion Vector reconstruction 310 and Picture Reconstruction 314 using the type of "staggered" illustrated in Table I. Such parallel processing may be implemented with a processing module capable of implementing parallel processing.

In a particular embodiment, multi-threaded decoding may be implemented by dividing the process of decoding a digital picture into two or more tasks based on data dependencies between the two or more tasks. The two or more tasks may be executed in parallel on three or more processors in a way that balances a processing load of executing the two or more tasks among the three or more processors. Details and examples of such multi-threaded decoding, including apparatus for implementing multi-threaded decoding, are described, e.g., in U.S. patent application Ser. No. 11/867,627 and U.S. Provisional Patent Application No. 60/863,767, both of which have been incorporated herein by reference.

Figure 4:
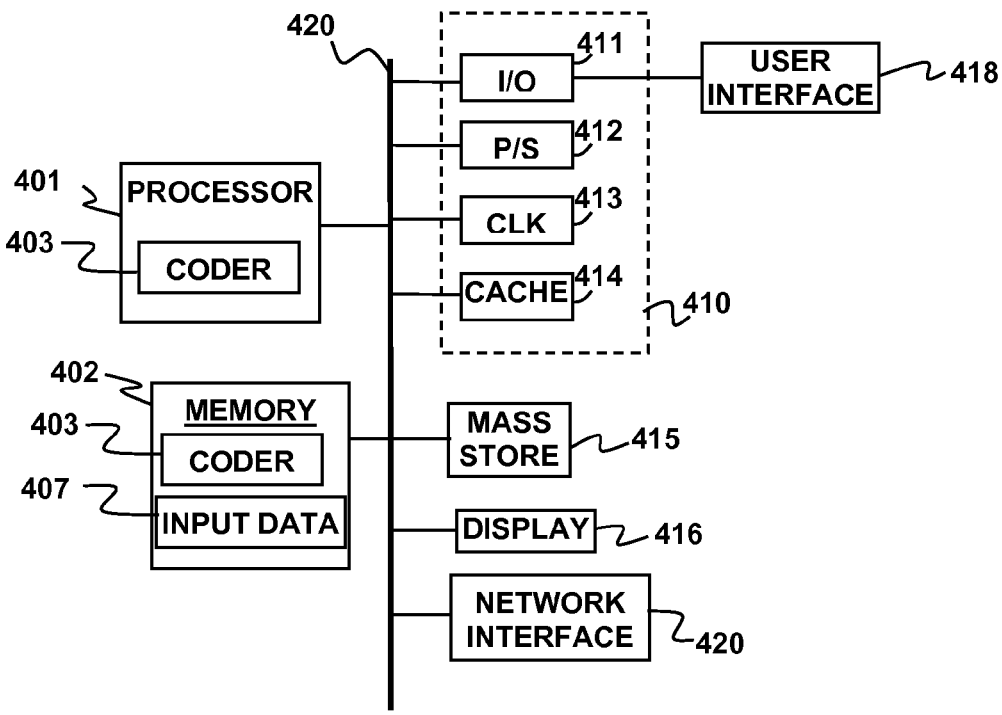
FIG. 4 is a block diagram illustrating an apparatus for encoding and/or decoding a digital picture according to an embodiment of the present invention.

FIG. 4 illustrates a block diagram of a computer apparatus 400 that may be used to implement picture decoding as described above. The apparatus 400 generally includes may include a processor module 401 and a memory 402. The processor module 401 may include one or more processor cores. As an example of a processing system that uses multiple processor modules, is a Cell processor, examples of which are described in detail, e.g., in *Cell Broadband Engine Architecture*, which is available online at http://www-306.ibm.com/chips/techlib/techlib.nsf/techdocs/
1AEEE1270EA2776387257060006E61BA/$file/CBEA_
01_pub.pdf, which is incorporated herein by reference.

The memory 402 may be in the form of an integrated circuit, e.g., RAM, DRAM, ROM, and the like). The memory may also be a main memory that is accessible by all of the processor modules 401. In some embodiments, the processor module 401 may local memories associated with each core. A coder program 403 may be stored in the main memory 402 in the form of processor readable instructions that can be executed on the processor modules 401. The coder program 403 may be configured to encode a picture into compressed signal data, e.g., as described above with respect to FIG. 2A and/or to decode compressed signal data, e.g., as described above with respect to FIG. 2B and FIG. 3. The coder program 403 may be written in any suitable processor readable language, e.g., C, C++, JAVA, Assembly, MATLAB, FORTRAN and a number of other languages. Input data 407 may be stored in the memory 402. Such input data may include buffered portions of a streaming data, e.g., encoded video pictures or portions thereof. During execution of the coder program 403, portions of program code and/or data 407 may be loaded into the memory 402 or the local stores of processor cores for parallel processing by multiple processor cores. By way of example, and not by way of limitation, the input data 407 may include video pictures, or sections thereof, before encoding or decoding or at intermediate stages of encoding or decoding. In the case of decoding, the input data may include un-decoded sections, sections that have been decoded, but not post-processed and sections that have been decoded and post processed. These various sections may be stored in one or more buffers. In particular, decoded and/or post processed sections may be stored in an output picture buffer implemented in the memory 402.

The coder program 403 may include instructions that when executed by the processor 401 implement a method for decoding pictures by a) padding all un-decoded pixels within a currently decoding picture with temporary pixel values; b) searching the picture for a matching section for use as a reference in pixel reconstruction of a section of the picture independent of whether the picture is intra-coded or inter-coded; and c) using the matching section to perform pixel prediction on the section to generate one or more decoded pixels for the section.

The apparatus 400 may also include well-known support functions 410, such as input/output (I/O) elements 411, power supplies (P/S) 412, a clock (CLK) 413 and cache 414. The apparatus 400 may optionally include a mass storage device 415 such as a disk drive, CDROM drive, tape drive, or the like to store programs and/or data. The device 400 may also optionally include a display unit 416 and user interface unit 418 to facilitate interaction between the apparatus 400 and a user. The display unit 416 may be in the form of a cathode ray tube (CRT) or flat panel screen that displays text, numerals, graphical symbols or images. The user interface 418 may include a keyboard, mouse, joystick, light pen or other device that may be used in conjunction with a graphical user interface (GUI). The apparatus 400 may also include a network interface 420 to enable the device to communicate with other devices over a network, such as the internet. These components may be implemented in hardware, software or firmware or some combination of two or more of these.

There are a number of additional ways to streamline parallel processing with multiple processors in the apparatus 400. For example, it is possible to "unroll" processing loops, e.g., by replicating code on two or more processor cores and having each processor core implement the code to process a different piece of data. Such an implementation may avoid a latency associated with setting up the loop.

Figure 5:
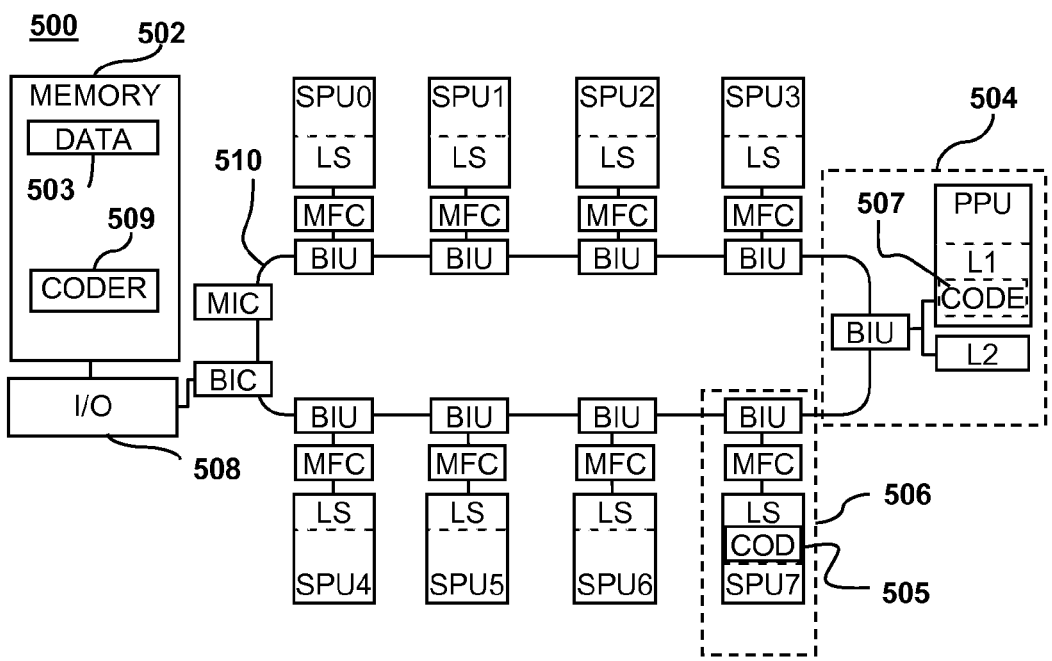
FIG. 5 is a block diagram illustrating an example of a cell processor implementation of an apparatus for encoding and/or decoding a digital picture according to an embodiment of the present invention.

One example, among others of a processing system capable of implementing parallel processing on three or more processors is a cell processor. There are a number of different processor architectures that may be categorized as cell processors. By way of example, and without limitation, FIG. 5 illustrates a type of cell processor 500. The cell processor 500 includes a main memory 502, a single power processor element (PPE) 504 and eight synergistic processor elements (SPE) 506. Alternatively, the cell processor 500 may be configured with any number of SPE's. With respect to FIG. 5, the memory 502, PPE 504, and SPEs 506 can communicate with each other and with an I/O device 508 over a ring-type element interconnect bus 510. The memory 502 contains input data 503 having features in common with the input data 407 described above and a coder program 509 having features in common with the coder program 403 described above. At least one of the SPE 506 may include in its local store (LS) decoding instructions 505 and/or a portion of the buffered input data that is to be processed in parallel, e.g., as described above. The PPE may include in its L1 cache, code instructions 507 having features in common with the coder program 403 described above. Instructions 505 and data 507 may also be stored in memory 502 for access by the SPE and PPE when needed.

By way of example the PPE 504 may be 64-bit PowerPC Processor Unit (PPU) with associated caches. The PPE 504 may include an optional vector multimedia extension unit. Each SPE 506 includes a synergistic processor unit (SPU) and a local store (LS). In some implementations, the local store may have a capacity of e.g., about 256 kilobytes of memory for code and data. The SPUs are less complex computational units than PPU, in that they typically do not perform any system management functions. The SPUs may have a single instruction, multiple data (SIMD) capability and typically process data and initiate any required data transfers (subject to access properties set up by a PPE) in order to perform their allocated tasks. The SPUs allow the system 500 to implement applications that require a higher computational unit density and can effectively use the provided instruction set. A significant number of SPUs 505 in a system, managed by the PPE 504, allows for cost-effective processing over a wide range of applications. By way of example, the cell processor 500 may be characterized by an architecture known as Cell Broadband engine architecture (CBEA). In CBEA-compliant architecture, multiple Peps may be combined into a PPE group and multiple SPEs may be combined into an SPE group. For the purposes of example, the cell processor 500 is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in *Cell Broadband Engine Architecture*, which is available online at: http://www-306.ibm.com/chips/techlib/techlib.nsf/techdocs/
1AEEE1270EA2776387257060006E61BA/$file/CBEA_
01_pub.pdf, which is incorporated herein by reference.

Embodiments of the invention provide systems and methods for parallel decoding of streaming data, such as encoded streaming video. Such embodiments may be applied to most video decoders, in particular, H.264/AVC decoders and, more particularly, to products that have video decoder as a module. Examples of such products include but are not limited to video game consoles, DVD players, software (PC) video decoder/player, video on cell phones, and the like. In alternative embodiments, such systems and methods may be applied to decoding of streaming data other than video. Examples of such embodiments include systems and methods for decoding streaming audio data, graphic rendering streams, still picture and XML documents. Embodiments of the present invention may be desirable for various applications recording a video game, streaming game images to a portable game device and uploading and sharing game results with multiple game systems connected via a network.

As noted above, embodiments of the invention may be implemented by modifying existing video coding standards to allow the current picture used as reference when this would otherwise not be allowed.

Although examples have been described above in terms of decoding video images, one may alternatively utilize embodiments of the present invention for decoding still pictures, e.g., in JPEG. To implement this one could add a motion vector computation function to an existing JPEG decoder and modifying the decoder to enable inter prediction and to allow the current picture to be used as a reference picture.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for decoding a digitally encoded picture, comprising:
    a) padding all un-decoded pixels within a currently decoding picture with temporary pixel values to produce a padded picture; and
    b) performing pixel prediction for a section of a digital picture using the padded picture as a reference picture independent of whether the digital picture is intra-coded or inter-coded, wherein performing pixel prediction includes utilizing motion compensation functions within a codec used to decode the currently decoding picture even if the currently decoding picture is intra coded.

2. The method of claim 1 wherein a) includes replacing all un-decoded pixels in a row of pixels within the digital picture with a last decoded pixel in the row.

3. The method of claim 1 wherein a) includes replacing all un-decoded pixels in a column of pixels within the digital picture with a last decoded pixel in the column.

4. The method of claim 1 wherein b) includes extracting a motion vector for the section from the currently decoding picture even if the currently decoding picture is intra coded and using the motion vector to perform pixel prediction to generate one or more predicted pixels for the section, wherein the motion vector represents an offset between the section and a reference section.

5. The method of claim 4, further comprising extracting one or more transform coefficients from the currently decoding picture and calculating one or more residual pixels for the section from the transform coefficients.

6. The method of claim 5, further comprising combining the residual pixels and the predicted pixels to produce one or more decoded pixels for the section.

7. The method of claim 6, further comprising performing post-processing on the decoded pixels.

8. The method of claim 1, further comprising performing pixel prediction on the section to generate one or more predicted pixels for the section.

9. The method of claim 8 wherein a) includes copying padding pixels from a decoded section of the digital picture that has not yet undergone post-processing.

10. The method of claim 8, further comprising performing post-processing on the decoded pixels for the section after all sections of the currently processing picture have undergone pixel prediction.

11. The method of claim 1 wherein the section of the picture is a macroblock within the digital picture.

12. The method of claim 1 wherein the section of the picture is a block within a macroblock within the digital picture.

13. The method of claim 1 wherein the digital picture includes artificially generated content.

14. The method of claim 1, further comprising, prior to b) placing the padded picture into a list of reference pictures available for decoding.

15. The method of claim 1, further comprising:
    dividing a process for decoding the picture into two or more tasks based on data dependencies between the two or more tasks; and
    executing the two or more tasks in parallel on three or more processors in a way that balances a processing load of executing the two or more tasks among the three or more processors.

16. An apparatus for decoding a digitally encoded picture, comprising:
    a processor module;
    a memory; and
    computer coded instructions embodied in the memory and executable by the processor, wherein the computer coded instructions are configured to implement a method for decoding a digitally encoded picture upon execution by the processor, the method comprising:
    a) padding all un-decoded pixels within a currently decoding picture with temporary pixel values to produce a padded picture; and
    b) performing pixel prediction for a section of a digital picture using the padded picture as a reference picture independent of whether the digital picture is intra-coded or inter-coded, wherein performing pixel prediction includes utilizing motion compensation functions within a codec used to decode the currently decoding picture even if the currently decoding picture is intra coded.

17. The apparatus of claim 16, wherein the processor module includes three or more processors; and
    wherein the processor readable instructions include instructions operable on the three or more processors, the instructions being configured to implement a method for decoding streaming data, the method comprising:
    dividing a process for decoding the digital picture into two or more tasks based on data dependencies between the two or more tasks; and
    executing the two or more tasks in parallel on the three or more processors in a way that balances a processing load of executing the two or more tasks among the three or more processors.

18. A non-transitory computer-readable medium having embodied therein coded instructions executable by a computer processor, the computer coded instructions being configured to implement a method for decoding a digitally encoded picture upon execution by the processor, the method comprising:

a) padding all un-decoded pixels within a currently decoding picture with temporary pixel values to produce a padded picture; and b) performing pixel prediction for a section of a digital picture using the padded picture as a reference picture independent of whether the digital picture is intra-coded or inter-coded, wherein performing pixel prediction includes utilizing motion compensation functions within a codec used to decode the currently decoding picture even if the currently decoding picture is intra coded.

* * * * *